(12) United States Patent
Nakagawa et al.

(10) Patent No.: US 8,970,061 B2
(45) Date of Patent: Mar. 3, 2015

(54) ELECTRIC VEHICLE

(75) Inventors: Hideaki Nakagawa, Wako (JP); Isao Shokaku, Wako (JP); Kenji Tamaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 441 days.

(21) Appl. No.: 13/395,038

(22) PCT Filed: Sep. 7, 2010

(86) PCT No.: PCT/JP2010/065322
§ 371 (c)(1),
(2), (4) Date: Mar. 8, 2012

(87) PCT Pub. No.: WO2011/033966
PCT Pub. Date: Mar. 24, 2011

(65) Prior Publication Data
US 2012/0169143 A1    Jul. 5, 2012

(30) Foreign Application Priority Data

Sep. 15, 2009   (JP) .................................. 2009-213537

(51) Int. Cl.
*B60L 1/00* (2006.01)
*B60L 3/04* (2006.01)
(Continued)

(52) U.S. Cl.
CPC .................. *B60L 3/04* (2013.01); *B60L 3/0046* (2013.01); *B60L 11/1818* (2013.01);
(Continued)

(58) Field of Classification Search
USPC ........................................................ 307/10.1
See application file for complete search history.

(56) References Cited

U.S. PATENT DOCUMENTS 5,998,884 A    12/1999   Kitamine et al.

FOREIGN PATENT DOCUMENTS

| CN | 1796184 A | 7/2006 |
| CN | 100404319 C | 7/2008 |

(Continued)

OTHER PUBLICATIONS

International Search Report corresponding to International Patent Application No. PCT/JP2010/065322 dated Oct. 12, 2010 and English Translation Thereof.

(Continued)

*Primary Examiner* — Rexford Barnie
*Assistant Examiner* — Dru Parries
(74) *Attorney, Agent, or Firm* — Squire Patton Boggs (US) LLP

(57) ABSTRACT

In an electric vehicle in which a high voltage battery supplying electric power to an electric motor generating power to drive a drive wheel and a low voltage battery supplying electric power to an accessory are mounted in a vehicle body, a breaker (62) is provided in a circuit (74) of a high power system linked to the high voltage battery (36); manual connection-disconnection means (71) for allowing switching between connection and disconnection of a circuit (75) of a low power system linked to the low voltage battery (40) to be performed by a manual operation is provided in the circuit (75) of the low power system; a relay switch (63, 64) which is capable of performing switching between connection and disconnection of the circuit (74) of the high power system by being supplied with electric power from the circuit (75) of the low power system, and which interrupts the circuit (74) of the high power system when the circuit (75) of the low power system is interrupted is provided on the circuit (74) of the high power system; and touch prevention means allows the breaker (62) to be touched only when the circuit (75) of the low power system is interrupted by using the manual connection-disconnection means (71). Accordingly, it is possible to make a work procedure in the maintenance of a breaker of a high power system easier to follow.

7 Claims, 14 Drawing Sheets

(51) Int. Cl.
  *B60L 3/00* (2006.01)
  *B60L 11/18* (2006.01)
  *B62K 11/10* (2006.01)
  *B60K 1/04* (2006.01)
  *B60K 7/00* (2006.01)
  *B60K 11/06* (2006.01)
  *B60K 1/00* (2006.01)

(52) U.S. Cl.
  CPC ........ *B60L 11/1868* (2013.01); *B60L 11/1877* (2013.01); *B62K 11/10* (2013.01); *B60K 1/04* (2013.01); *B60K 7/0007* (2013.01); *B60L 2200/12* (2013.01); *B60L 2210/10* (2013.01); *B60L 2210/30* (2013.01); *B62K 2202/00* (2013.01); *B62K 2204/00* (2013.01); *B62K 2208/00* (2013.01); *B60K 11/06* (2013.01); *B60K 2001/005* (2013.01); *B60K 2007/0038* (2013.01); *B60K 2007/0061* (2013.01); *B60Y 2200/126* (2013.01); *Y02T 10/7088* (2013.01); *Y02T 10/7005* (2013.01); *Y02T 10/7241* (2013.01); *Y02T 10/7066* (2013.01); *Y02T 10/7216* (2013.01); *Y02T 90/121* (2013.01); *Y02T 90/14* (2013.01); *Y02T 90/127* (2013.01)
  USPC ........................................................ 307/10.1

(56) References Cited

FOREIGN PATENT DOCUMENTS

| | | |
|---|---|---|
| EP | 1 460 439 B1 | 3/2010 |
| JP | 2001-320801 A | 11/2001 |
| JP | 2003-063328 A | 3/2003 |
| JP | 2003-194870 A | 7/2003 |
| JP | 2006-182315 A | 7/2006 |
| JP | 2006-327251 A | 12/2006 |
| JP | 3966967 B2 | 6/2007 |
| JP | 3966967 B2 | 8/2007 |
| JP | 2007-246038 A | 9/2007 |

OTHER PUBLICATIONS

Korean Notice of Allowance application No. 9-5-2014 036393027 dated May 27, 2014.
Chinese Office Action application No. 201080041071.6 dated Dec. 4, 2013.

ELECTRIC VEHICLE

TECHNICAL FIELD

The present invention relates to an electric vehicle in which a high voltage battery supplying electric power to an electric motor generating power to drive a drive wheel and a low voltage battery supplying electric power to an accessory are mounted in a vehicle body.

BACKGROUND ART

An electric motorcycle of the following configuration has been already known in Patent Document 1. Electric power is supplied to an electric motor from a high voltage battery of, for example, 36 V, and electric power is supplied to a control unit (ECU) from a low voltage battery of, for example, 12 V.

PRIOR ART DOCUMENT

Patent Document

Patent Document 1: Japanese Patent Application Laid-open No. 2006-1812315.

SUMMARY OF INVENTION

Problems to be Solved by the Invention

Incidentally, the following technique is well known. In a case where a power system in a single vehicle is divided into a high power system linked to a high voltage battery and a low power system linked to a low voltage battery, the increase in length of wiring of the high power system and the increase in size of a switch circuit of the high power system can be suppressed by using a relay of the low power system to perform switching between connection and disconnection of the high power system. In many cases, a fuse is provided in a circuit of the high power system as a breaker. There has been a desire to perform a maintenance work of the breaker without special care when the maintenance (replacement work) of the breaker is to be performed.

The present invention is made in view of the circumstances described above, and an object thereof is to provide an electric vehicle in which a work procedure in the maintenance of a breaker of a high power system is made easier to follow.

Means for Solving the Problems

In order to attain the above object, according to a first aspect of the present invention, there is provided an electric vehicle in which a high voltage battery supplying electric power to an electric motor generating power to drive a drive wheel and a low voltage battery supplying electric power to an accessory are mounted in a vehicle body, characterized in that the electric vehicle comprises: a breaker which is provided in a circuit of a high power system linked to the high voltage battery; manual connection-disconnection means for allowing switching between connection and disconnection of a circuit of a low power system linked to the low voltage battery to be performed by a manual operation, the manual connection-disconnection means provided in the circuit of the low power system; a relay switch which is capable of performing switching between connection and disconnection of the circuit of the high power system by being supplied with electric power from the circuit of the low power system, and which interrupts the circuit of the high power system when the circuit of the low power system is interrupted; and touch prevention means for allowing the breaker to be touched only when the circuit of the low power system is interrupted by using the manual connection-disconnection means.

Furthermore, according to a second aspect of the present invention, in addition to the configuration of the first aspect, the touch prevention means is configured to allow a lid member covering the breaker and openably and closably attached to a case to be opened only when the circuit of the low power system is interrupted by using the manual connection-disconnection means.

According to a third aspect of the present invention, in addition to the configuration of the second aspect, the manual connection-disconnection means is disposed at a position facing the lid member from an opening side of the lid member, in a way that the lid member is allowed to be opened when the manual connection-disconnection means is manually interrupted.

According to a fourth aspect of the present invention, in addition to the configuration of the second or third aspect, the lid member is fastened to the case forming part of a battery case housing the high voltage battery, by using a plurality of screw members, and the touch prevention means is provided by disposing a connector being the manual connection-disconnection means in a way that the connector covers, from the opening side of the lid member, at least one of the plurality of screw members while allowing switching between conduction and interruption of a conductive wire forming part of the circuit of the low power system to be performed by a manual operation.

According to a fifth aspect of the present invention, in addition to the configuration of the fourth aspect, the breaker and the lid member are each disposed at a position offset from a center in a width direction of the battery case to one side in a plan view.

According to a sixth aspect of the present invention, in addition to the configuration of the first aspect, a vehicle-body frame forming part of the vehicle body includes: a down frame extending downward toward the rear from a head pipe steerably supporting a front fork pivotally supporting a front wheel; a pair of right and left under frames extending rearward from a lower portion of the down frame; and a pair of right and left rear frames extending upward toward the rear respectively from rear portions of the under frames, the high voltage battery is disposed between the pair of right and left under frames, the low voltage battery is disposed between the pair of right and left rear frames, and the relay switch is disposed between the high voltage battery and the low voltage battery in a side view.

Furthermore, according to a seventh aspect of the present invention, in addition to the configuration of the sixth aspect, a front portion of a swingarm pivotally supporting a rear wheel being the drive wheel is swingably supported by the rear frames of the vehicle-body frame, the electric motor and a power drive unit disposed frontward of the rear wheel for controlling the electric motor are provided in the swingarm, and the relay switch is disposed in a region surrounded by the high voltage battery, the low voltage battery, and the power drive unit in the side view.

Here, a head lamp 51 and a tail lamp 52 of an embodiment correspond to the accessory of the present invention; a fuse 62 of the embodiment corresponds to the breaker of the present invention; a connector 71 of the embodiment corresponds to the manual connection-disconnection means of the present invention; an upper case 79 of the embodiment corresponds to the case of the present invention; a lid member 109 of the embodiment corresponds to the lid member of the present invention; and a screw member 110 of the embodiment corresponds to the screw member of the present invention.

Effects of the Invention

According to the first and second aspects of the invention, the breaker is allowed to be touched only when the circuit of the low power system is interrupted by using the manual connection-disconnection means, by the action of the touch prevention means, and in this state, the relay switch is in the interrupted state and the circuit of the high power system is interrupted. Thus, when the maintenance of the breaker is to be performed, the interruption of the circuit of the low power system by using the manual connection-disconnection means is required. Hence, it is easier to follow a work procedure in the maintenance of the breaker of the high power system.

Moreover, According to the third and fourth aspects of the invention, the lid member is allowed to be opened when the manual interruption is made by use of the manual connection-disconnection means. Thus, the touch prevention means of a simple structure can be configured.

According to the fifth aspects of the invention, the breaker and the lid member forming part of the touch prevention means are each at a position offset from the width direction center of the battery case to one side in a plan view. Thus, it is easier to perform a maintenance work from one side in a width direction of the vehicle body.

According to the sixth aspect of the invention, the high voltage battery is disposed between the pair of right and left under frames, and the low voltage battery is disposed between the pair of right and left rear frames. Thus, the high voltage battery and the low voltage battery can be protected from the outside. The relay switch is disposed between the high voltage battery and the low voltage battery in the side view. Thus, relay wiring can be made compact.

According to the seventh aspect of the invention, the electric motor and the power drive unit are provided in the swingarm, and the relay switch is disposed in a position surrounded by the high voltage battery, the low voltage battery and the power drive unit in the side view. Thus, it is possible to dispose the electrical parts of a high voltage system around the relay switch, and make wiring of a high voltage system compact.

EXPLANATION OF REFERENCE NUMERALS AND SYMBOLS

Figure 1:
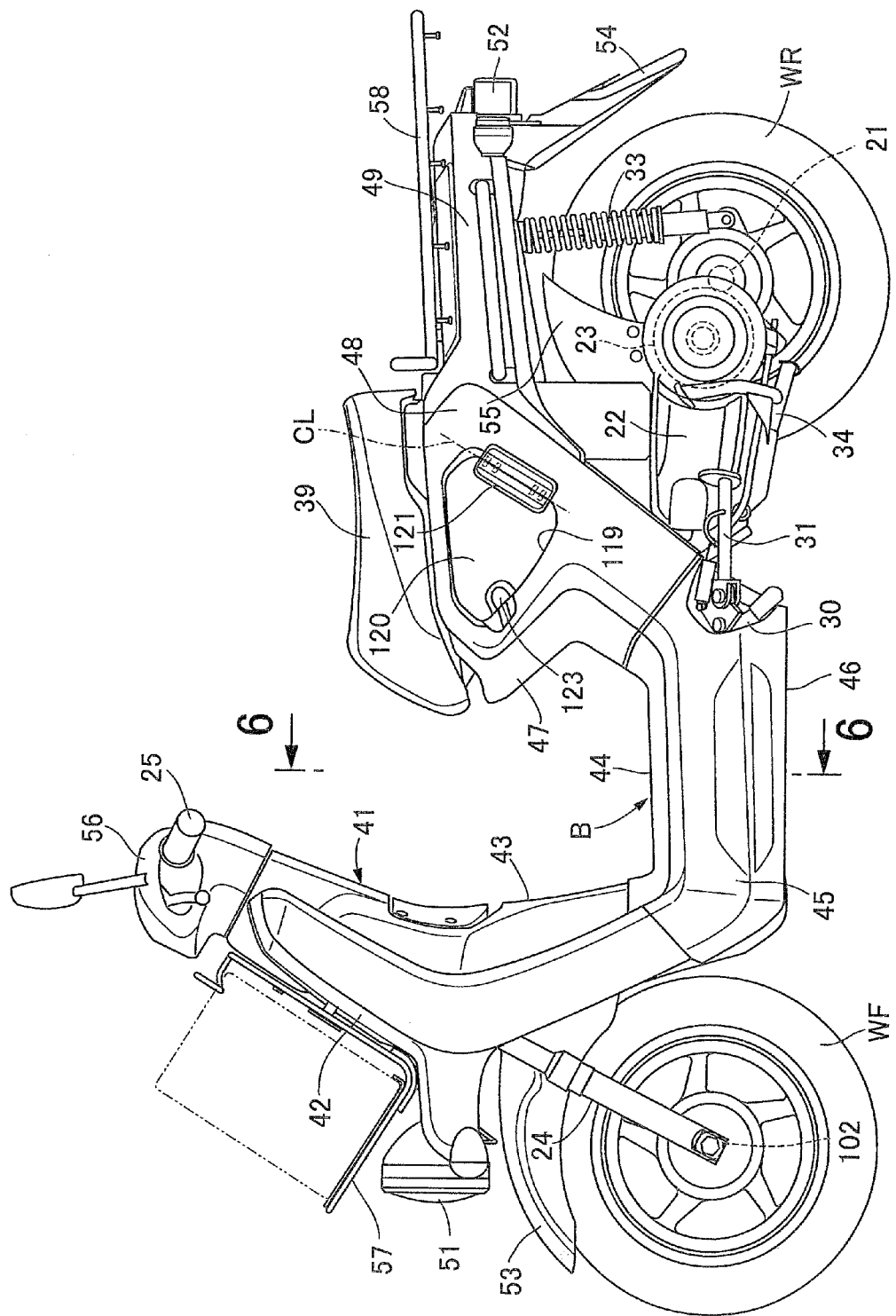
FIG. 1 is a side view of an electric two-wheeled motor vehicle. (first embodiment)

22 . . . Swingarm
23 . . . Electric motor
24 . . . Front fork
26 . . . Head pipe
27 . . . Down frame
28 . . . Under frame
29 . . . Rear frame
36 . . . High voltage battery
37 . . . Battery case
40 . . . Low voltage battery
51 . . . Head lamp being an accessory
52 . . . Tail lamp being an accessory
61 . . . Power drive unit
62 . . . Fuse being a breaker
63,64 . . . Relay switch
71 . . . Connector being manual connection-disconnection means
74 . . . Circuit of high power system
75 . . . Circuit of low power system
79 . . . Upper case being a case
109 . . . Lid member
110 . . . Screw member
111 . . . Touch prevention means
B . . . Vehicle body
F . . . Vehicle-body frame
WF . . . Front Wheel
WR . . . Rear Wheel being a drive wheel Mode For Carrying Out The Invention An embodiment of the present invention is explained below by reference to FIG. 1 to FIG. 14.

First Embodiment

At first, referring to FIG. 1, an electric vehicle is a scooter type electric two-wheeled motor vehicle having a low floor 44, and is configured such that a rear wheel WR being a drive wheel is rotationally driven by rotational power generated by an electric motor 23 built into a swingarm 22 whose rear potion pivotally supports an axle 21 of the rear wheel WR.

Figure 2:
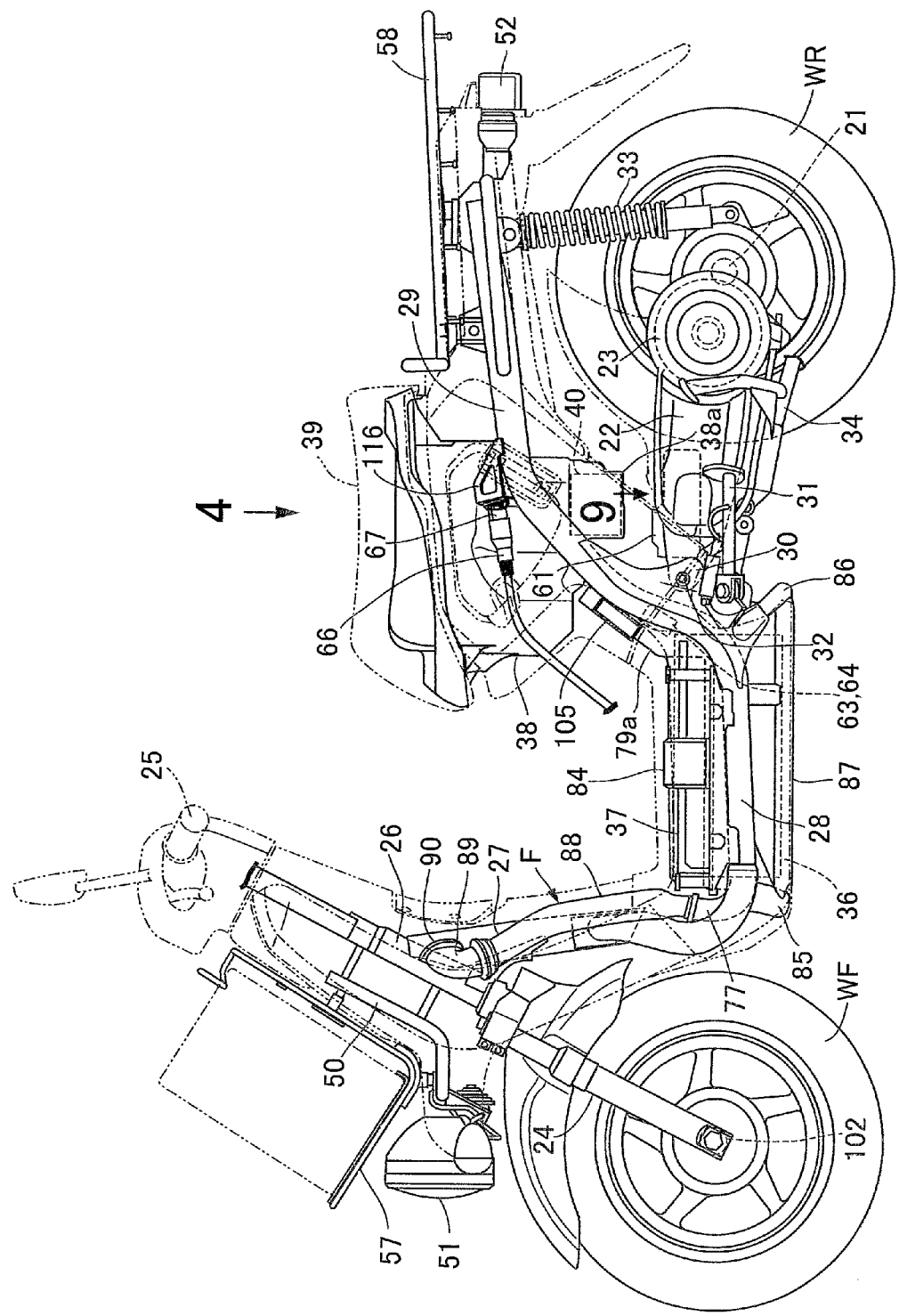
FIG. 2 is a side view of the electric two-wheeled motor vehicle with a vehicle body cover being omitted. (first embodiment)

Referring to FIG. 2, a vehicle-body frame F of the electric two-wheeled motor vehicle includes a head pipe 26 which steerably supports a front fork 24 pivotally supporting a front wheel WF and a steering handle 25 connected to an upper portion of the front fork 24, a down frame 27 which extends downward toward the rear from the head pipe 26, a pair of right and left under frames 28 . . . which are connected to a lower portion of the down frame 27 and extend rearward, and a pair of right and left rear frames 29 . . . which are integrally continuous respectively to rear ends of the under frames 28 . . . and extend upward toward the rear.

A side stand 31 for maintaining a standing state in which a vehicle body B is inclined to the left is turnably attached to pivot plates 30 provided respectively in front portions of both of the rear frames 29 . . . of the vehicle-body frame F. In addition, a front portion of the swingarm 22 is swingably supported by the pivot plates 30 via a pivot 32. A rear cushion unit 33 is provided between a rear portion of the left rear frame 29 among both of the rear frames 29 . . . and a rear portion of the swingarm 22. Moreover, a main stand 34 is turnably attached to the front portion of the swingarm 22.

A battery case 37 housing a high voltage battery 36 of, for example, 72 V for supplying electric power to the electric motor 23 is disposed between both of the under frames 28 . . . while being supported by both of the under frames 28 . . . . A housing box 38 disposed above the swingarm 22 in a side view is disposed between both of the rear frames 29 . . . while being supported by both of the rear frames 29 . . . . The housing box 38 is covered with a closeable and openable rider seat 39 from above. Moreover, a battery housing portion 38a that houses a low voltage battery 40 for supplying electric power of low voltage, for example, 12 V to accessories such as a head lamp 51, a tail lamp 52, and a control unit (not illustrated) is formed integral with a rear lower portion of the housing box 38 in such a way as to protrude downward.

The vehicle-body frame F is covered with a vehicle body cover 41 which forms the vehicle body B together with the vehicle-body frame F and is made of a synthetic resin. The vehicle body cover 41 includes a front cover 42 which covers the head pipe 26 from the front, a leg shield 43 which is continuous to the front cover 42 in such a way as to cover the leg portions of the rider sitting on the rider seat 39 from the front, the low floor 44 which is continuous to a lower portion of the leg shield 43 in such a way that the feet of the rider sitting on the ride seat 39 are placed thereon and which covers the battery case 37 from above, a pair of right and left floor side covers 45 . . . suspended from both lateral sides of the low floor 44 in such a way as to cover both of the under frames 28 . . . from both lateral sides, an under cover 46 which connects lower edges of both of the floor side covers 45 . . . , an under-seat-portion front cover 47 which extends upward from an rear end of the low floor 44 in such way as to cover a portion under the rider seat 39 from the front, a pair of right and left side covers 48 . . . which are continuous respectively to both lateral sides of the under-seat-portion front cover 47 in such a way as to cover the portion under the rider seat 39 from both lateral sides, and a rear cover 49 which is continuous to both of the side covers 48 . . . in such a way as to cover the rear wheel WR from above. The battery case 37 is covered with the low floor 44, the floor side covers 45 . . . , the under cover 46, the under-seat-portion front cover 47, and the side covers 48 . . . of the vehicle cover 41.

The head lamp 51 is disposed at a front end of the front cover 42 while being supported by a stay 50 fixed to the head pipe 26, and the tail lamp 52 is attached to the rear frames 29 . . . . Moreover, a front fender 53 covering the front wheel WF from above is attached to the front fork 24. A rear fender 54 covering the rear wheel WR from above in a rear oblique direction is provided continuous with the rear cover 49, and a fender 55 covering the rear wheel WR from above in a front oblique direction is attached to the front portion of the swingarm 22. Moreover, a center portion of the steering handle 25 is covered with a handle cover 56, a front carrier 57 disposed frontward of the front cover 42 is supported by the stay 50. A rear carrier 58 is disposed rearward of the rider seat 39 above the rear cover 49 while being supported by the rear frames 29 . . . .

Figure 3:
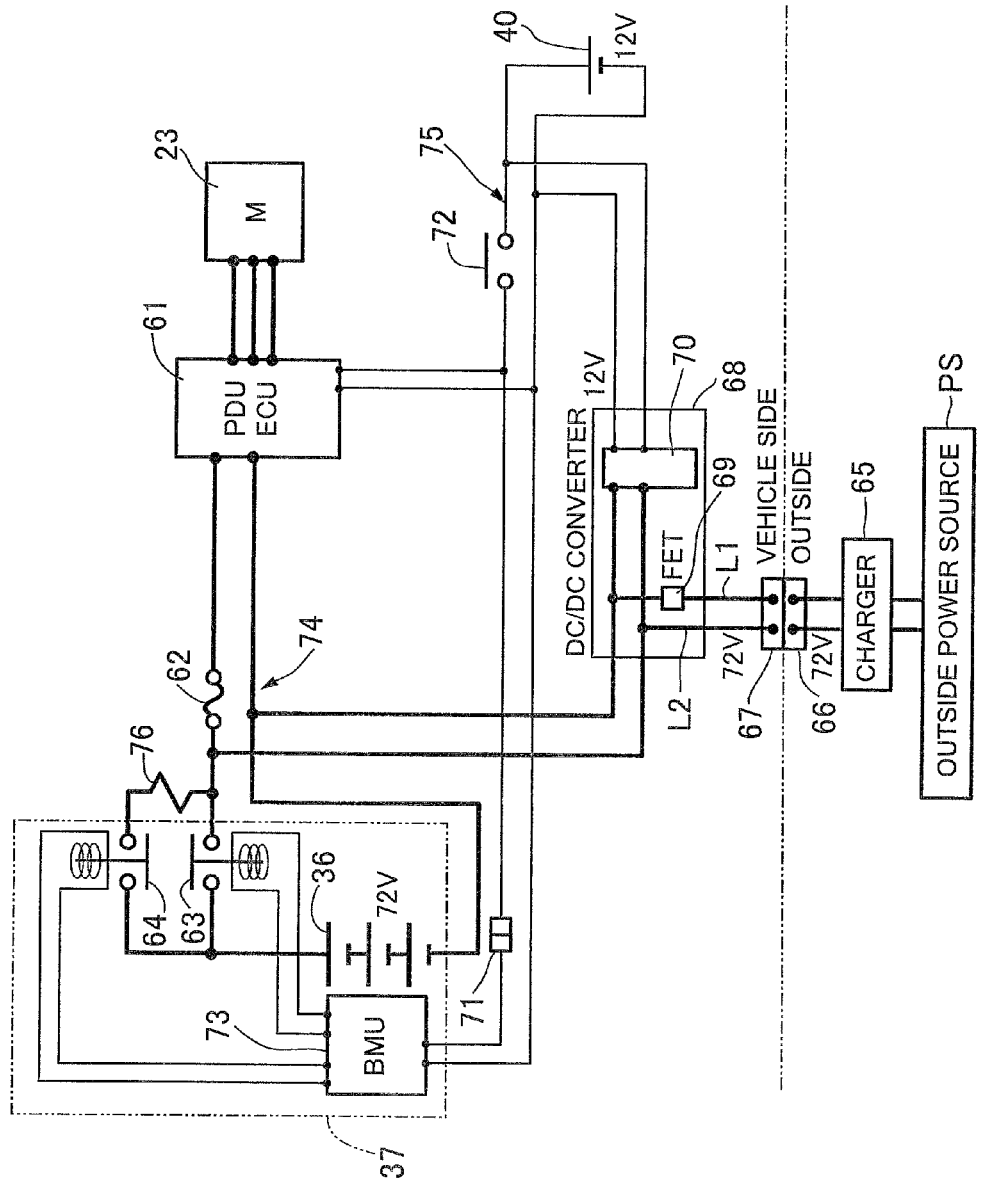
FIG. 3 is a schematic system diagram of an electric system. (first embodiment)

Referring to FIG. 3, the electric motor 23 is driven by a power drive unit (PDU) 61 including a control unit. The power drive unit 61 is connected to a positive terminal of the high voltage battery 36 via a fuse 62 and a first relay switch 63. A series circuit including a second relay switch 64 and a resistance 76 is connected in parallel to the first relay switch 63. Incidentally, the high voltage battery 36 and the low voltage battery 40 can be charged with a charger 65 which is capable of outputting a high voltage by being connected to an external power source PS, the high voltage being at the same level as that of high voltage battery 36. A power-receiving-side connector 67 to which a power-supplying-side connector 66 leading to the charger 65 connected to the external power source PS can be inserted and connected is provided on the vehicle side. The power-receiving-side connector 67 is connected to a DC-DC converter 68.

The DC-DC converter 68 includes a field effect transistor 69 which is provided in a line L1 of a pair of lines L1, L2 leading to the power-receiving-side connector 67 and a voltage drop circuit part 70 which is connected to both of the lines L1, L2 to drop the voltage from the charger 65 to a low voltage of, for example, 12 V. Both of the lines L1, L2 of the DC-DC converter 68 are connected to the positive terminal of the high voltage battery 36 via a parallel circuit of the first relay switch 63 and the series circuit including the second relay switch 64 and the resistance 76 to supply a charge current of the high voltage to the high voltage battery 36, and are also connected to a negative side terminal of the high voltage battery 36. The voltage drop circuit part 70 is connected to a positive terminal and a negative terminal of the low voltage battery 40.

The control unit included in the power drive unit 61 is connected to the positive terminal of the low voltage battery 40 via a main switch 72, and is also connected to the negative terminal of the low voltage battery 40. Moreover, switching between connection and disconnection of each of the first and second relay switches 63, 64 can be performed by use of a control current outputted from a battery managing unit (BMU) 73 by using electric power supplied from the low voltage battery 40. The battery managing unit 73 is connected to the positive terminal of the low voltage battery 40 via the main switch 72 and a connector 71, and is also connected to the negative terminal of the low voltage battery 40.

When the main switch 72 is turned ON, the battery managing unit 73 first sets the second relay switch 64 to a conductive state to cause an electric current to flow from the high voltage battery 36 to the power drive unit 61 via the second relay switch 64, the resistance 76, and the fuse 62, and thereafter causes the first relay switch 63 to be conductive. This prevents melting and adhering of the first relay switch 63 which are caused by an inrush current to a capacitor provided in the power drive unit 61.

Incidentally, a circuit between the high voltage battery 36 and the power drive unit 61 as well as a circuit between the high voltage battery 36 and the DC-DC converter 68 form a circuit (circuit shown in bold solid lines) 74 of a high power system leading to the high voltage 36. A circuit between the low voltage battery 40 and the power drive unit 61, a circuit between the low voltage battery 40 and the battery managing unit 73, and a circuit between the low voltage battery 40 and the DC-DC converter 68 form a circuit (circuit shown in thin solid lines) 75 of a low power system leading to the low voltage battery 40. The first relay switch 63, the second relay switch 64, the fuse 62 and the resistance 76 are provided in the circuit 74 of the high power system. The connector 71 and the main switch 72 are provided in the circuit 75 of the low power system.

Note that, the first relay switch 63, the second relay switch 64, and the battery managing unit 73 are housed in the battery case 37 housing the high voltage battery 36.

Figure 4:
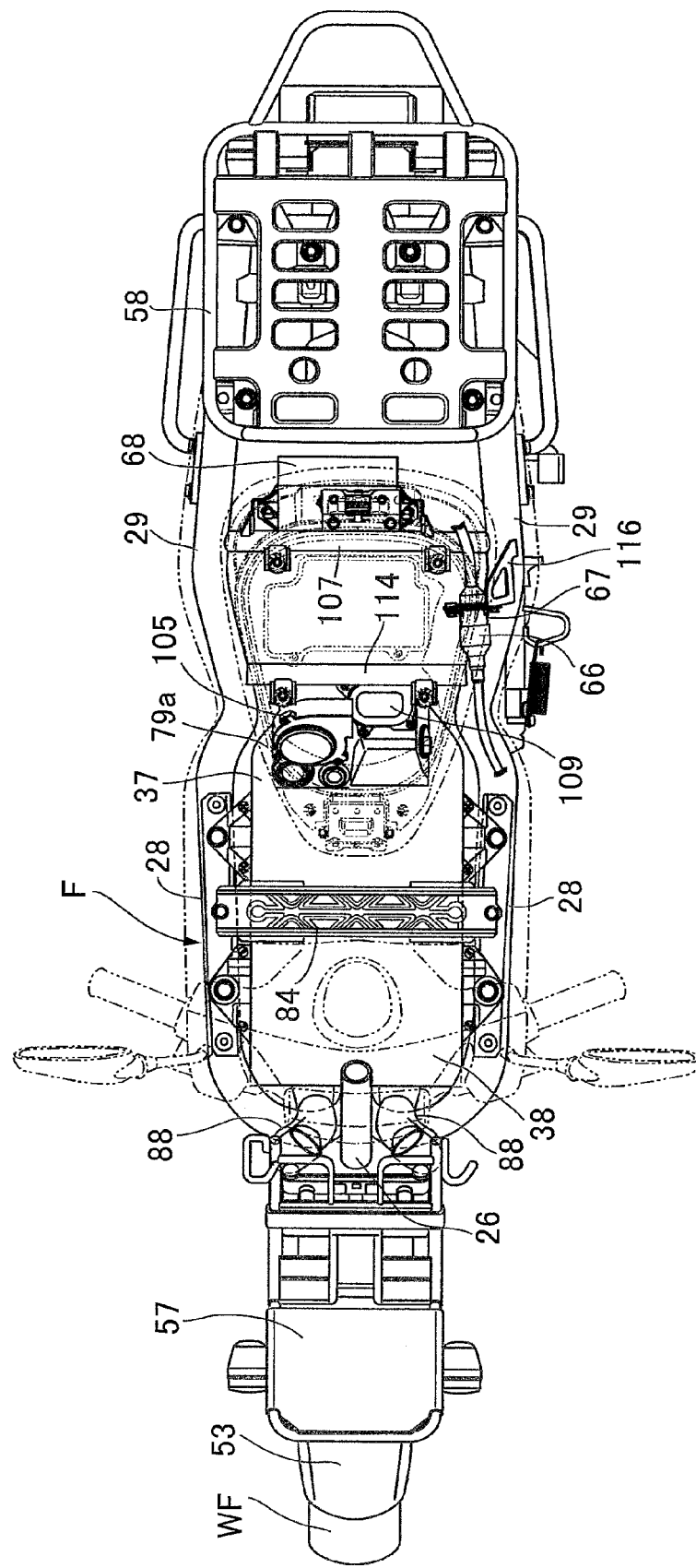
FIG. 4 is a view seen from an arrow 4 in FIG. 2. (first embodiment)
Figure 5:
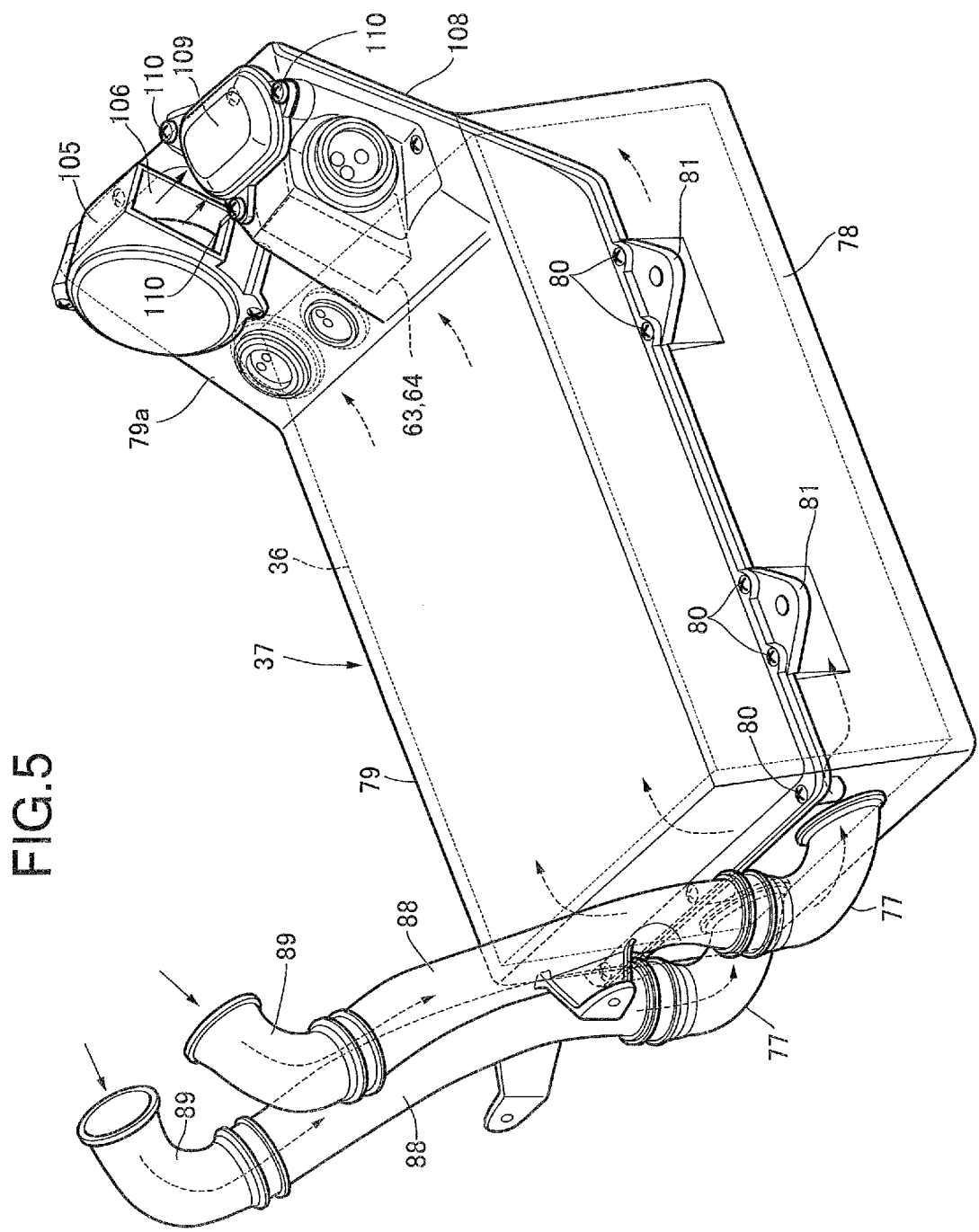
FIG. 5 is a perspective view of a battery box and cooling air introduction ducts. (first embodiment)

Referring also to FIGS. 4 and 5, the battery case 37 is formed by fastening a lower case 78 having a box shape with an open top and an upper case 79 having a box shape with an open bottom to each other with multiple screw members 80, 80.... Multiple support plates 81, 81... protruding sideward and fixedly attached to upper portions of lateral side portions of a half body of the lower case 78 are fastened to both of the under frames 28... of the vehicle-body frame F by using bolts 82, 82... and weld nuts 83, 83... welded to the under frames 28.... Thus, the battery case 37 is supported by both of the under frames 28....

A cross member 84 straddling a substantially center portion of the battery case 37 in a front-rear direction is provided between both of the under frames 28..., and the low floor 44 is supported by the cross member 84. Moreover, a front protection member 85 protecting a front lower portion of the battery case 37 from the front is provided between the front portions of both of the under frames 28... in such a way as to connect a center portion of the front protection member 85 to lower ends of the down frame 27. A rear portion protection member 86 protecting a rear lower portion of the battery case 37 from the rear is provided between rear portions of both of the under frames 28.... Multiple lower protection members 87, 87... extending in the front-rear direction are provided between the front and rear protection members 85, 86 to protect the battery case 37 from below.

Figure 6:
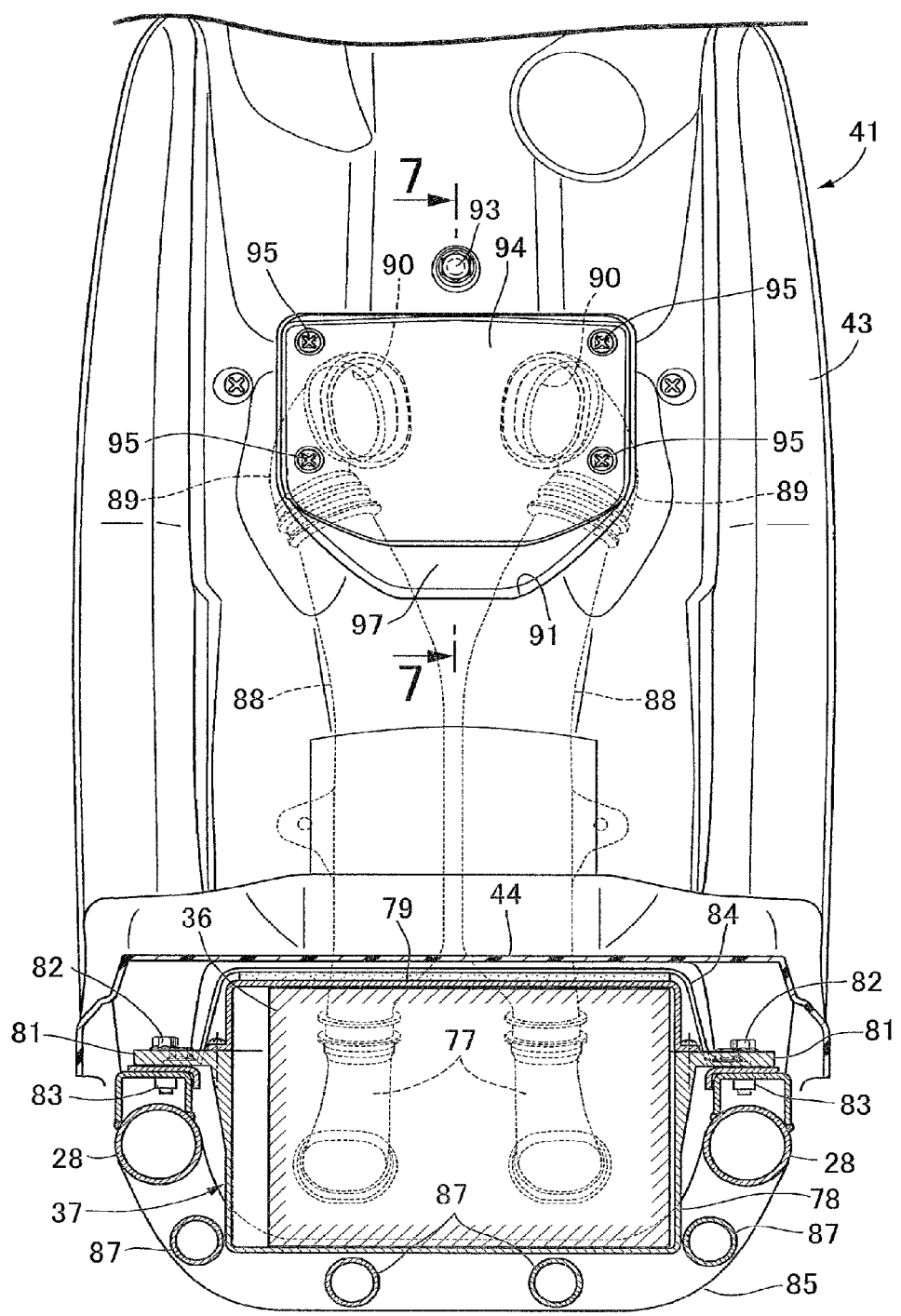
FIG. 6 is a sectional view taken along a line 6-6 in FIG. 1 with an under cover being omitted. (first embodiment)
Figure 7:
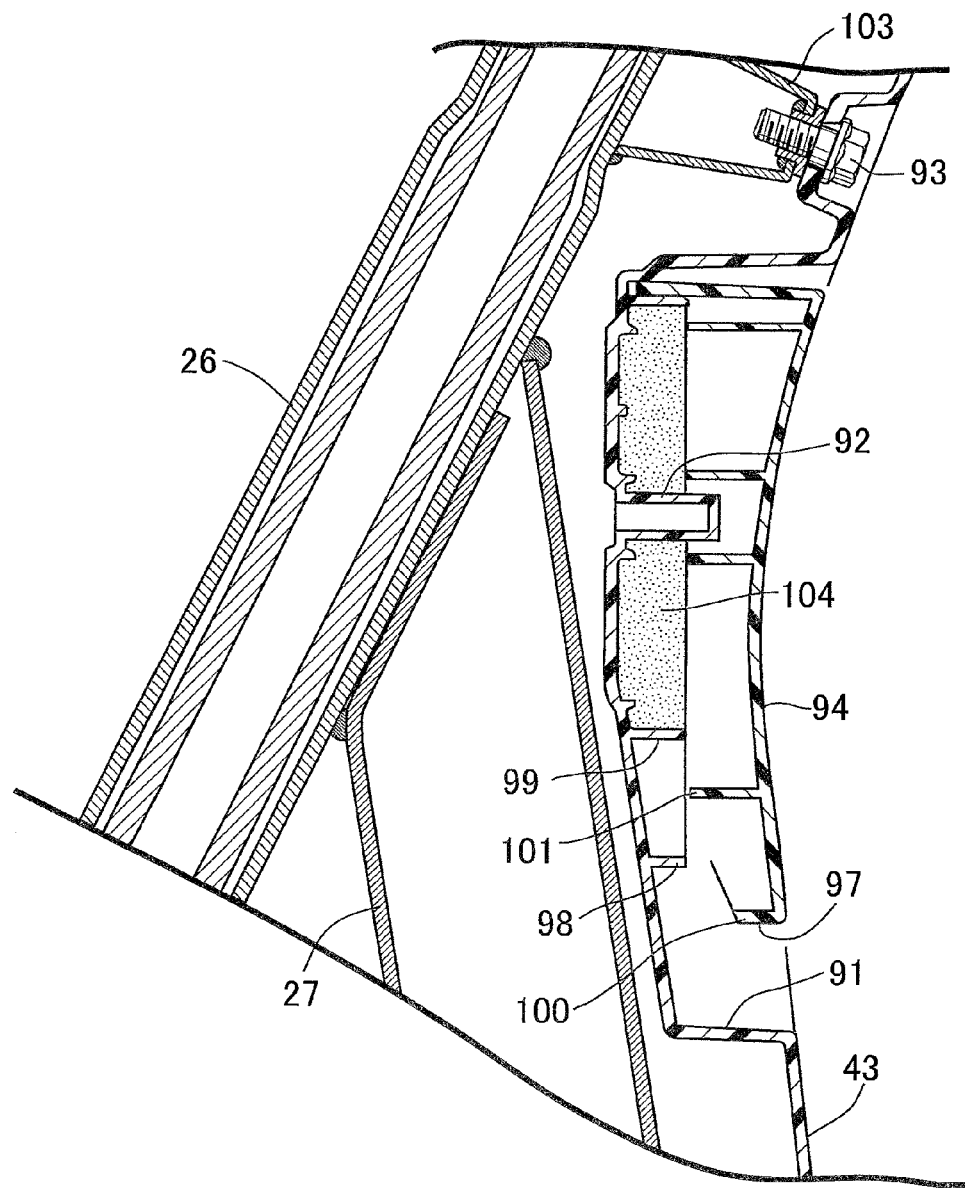
FIG. 7 is an enlarged sectional view taken along a line 7-7 in FIG. 6. (first embodiment)
Figure 8:
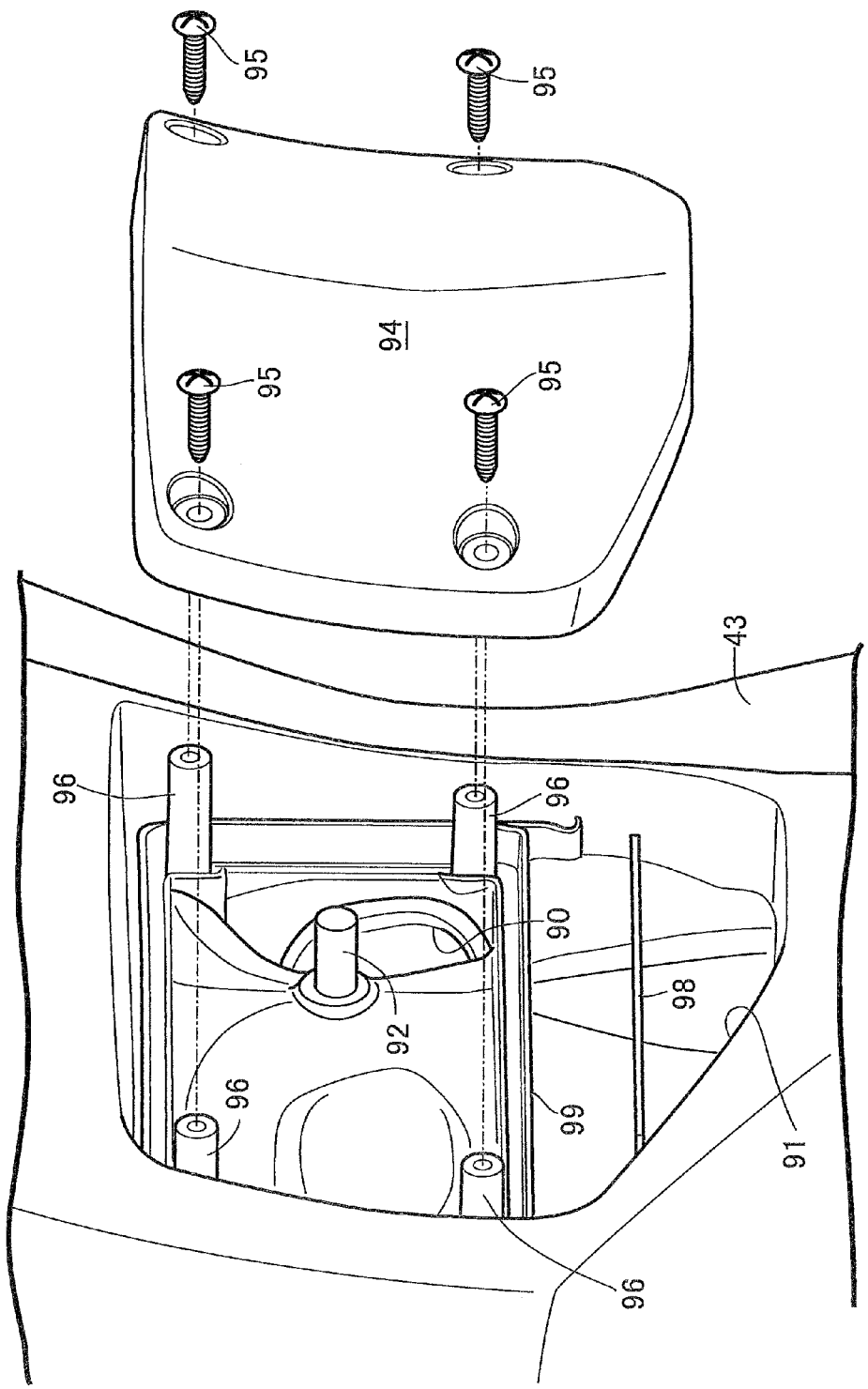
FIG. 8 is an exploded perspective view of a leg shield and a lid. (first embodiment)

Referring also to FIGS. 6 to 8, downstream end portions of a pair of right and left cooling air introduction ducts 88... are connected to a front portion of the lower case 78 of the battery case 37 via connection tubes 77.... Incidentally, the leg shield 43 is supported by being fixed to a stay 103 with a bolt 93, the stay 103 fixedly attached to a rear portion of the head pipe 26. Both of the cooling air introduction ducts 88... having the down frame 27 interposed therebetween from both sides in the leg shield 43 are disposed to extend along the down frame 27. Meanwhile, a pair of right and left openings 90, 90 opened toward the rear of the vehicle are provided in the leg shield 43 at positions corresponding to the connection portion of the down frame 27 to the head pipe 26. Upstream end portions of both of the cooling air introduction ducts 88... are connected to the leg shield 43 via connection tubes 89... to communicate with the openings 90..., respectively.

Incidentally, a recess portion 91 recessed frontward from a back surface of the leg shield 43 is formed in the leg shield 43, and both of the openings 90... are provided in an upper portion of the recess portion 91. Moreover, a first boss 92 is provided integral to the recess portion 91 in a center portion between both of the openings 90... in such a way as to protrude rearward.

A lid 94 covering both of the openings 90... is attached to the leg shield 43 with multiple screw members 95, 95.... Cylindrical second bosses 96, 96... are provided, in a protruding manner, integral to the recess portion 91 at positions corresponding to respective corners of an imaginary rectangle surrounding both of the openings 90.... The lid 94 whose inner surface is to be in contact with the second bosses 96, 96... is fastened to the leg shield 43 by using the screw members 95, 95... inserted through the lid 94 and screwed to the second bosses 96, 96....

An air introduction port 97 communicating with both of the openings 90... is formed between a lower edge of the lid 94 and a lower portion of the recess portion 91. Moreover, first protrusions 98, 99 extending long in a vehicle width direction and protruding rearward are provided respectively at multiple positions, for example, two positions with an interval in the up-down direction of the recess portion 91, in such a way that a gap allowing air to flow is formed between the lid 94 and each of the first protrusions 98, 99. Second protrusions 100, 101 extending long in the vehicle width direction and protruding frontward are provided respectively at multiple positions, for example, two positions with an interval in the up-down direction of the inner surface of the lid 94, in such a way that a gap allowing air to flow is formed between the recess portion 91 and each of the second protrusions 100, 101. Furthermore, the two first protrusions 98, 99 and the two second protrusions 100, 101 are alternately arranged in the up-down direction.

Moreover, a sponge-like filter member 104 is interposed between the leg shield 43 and the lid 94 to be provided between the air introduction port 97 and both of the openings 90.... The filter member 104 is positioned by having the first boss 92 inserted therethrough.

Incidentally, as shown in FIG. 1, the axle 102 of the front wheel WF is disposed frontward of the leg shield 43, and at least a portion of both of the openings 90..., whole portions of both of the openings 90... in this embodiment, are arranged above an upper end of the front wheel WF in the side view.

Figure 9:
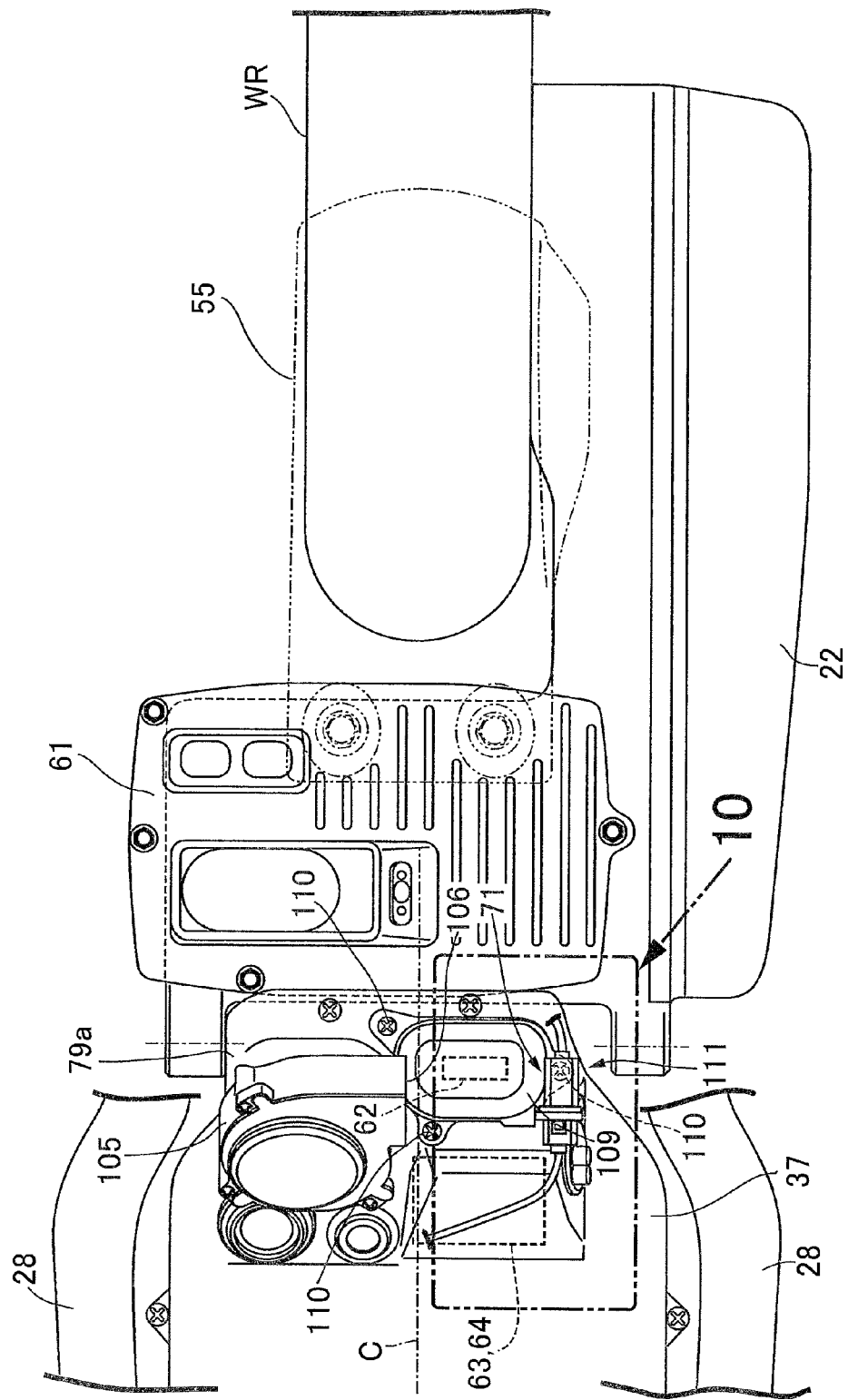
FIG. 9 is a view seen from an arrow 9 in FIG. 2. (first embodiment)

Referring also to FIG. 9, cooling air is introduced into the battery case 37 by activating a cooling fan 105 attached to a rear portion of an upper surface of the battery case 37, in this embodiment, to an upper surface of a rising portion 79a provided in a rear portion of the upper case 79 forming part of the battery case 37. The cooling fan 105 has its intake side connected to the rising portion 79a of the battery case 37, and an exhaust port 106 thereof is opened toward one side (toward the left in this embodiment) of the battery case 37 in the width direction. The cooling fan 105 is attached to the upper surface of the rising portion 79a at a position offset from a center C (see FIG. 9) in the width direction of the battery case 37 to the other side (to the right in this embodiment).

Moreover, the first and second relay switches 63, 64 provided in the circuit 74 of the high power system are housed in the rising portion 79a. As shown in FIG. 2, the first and second relay switches 63, 64 are disposed between the high voltage battery 36 and the low voltage battery 40 in the side view.

Incidentally, the power drive unit 61 disposed frontward of the rear wheel WR is provided in the front portion of the swingarm 22 which houses the electric motor 23 driving the rear wheel WR in the rear portion of the swingarm 22. The first and second relay switches 63, 64 housed in the rear portion of the battery case 37 is disposed in a region surrounded by the high voltage battery 36, the low voltage battery 40, and the power drive unit 61 in the side view. Moreover, the DC-DC converter 68 is disposed rearward of the housing box 38 while being supported by a cross member 107 (see FIG. 4) connecting both of the rear frames 29... to each other and supporting the rear portion of the housing box 38.

Moreover, the fuse 62 provided in the circuit 74 of the high power system is supported by a relay board 108 which is provided on the lower case 78 forming part of the battery case 37 and which covers the rising portion 79a from the rear, and is housed between the rising portion 79a and the relay board 108. A lid member 109 covering the fuse 62 from above is fastened to the rising portion 79a of the upper case 79 by using multiple screw members 110.... Furthermore, the lid member 109 is disposed to be offset from the width direction center C of the battery case 37 to one side (to the left in this embodiment) in a plan view.

The connector 71 provided in the circuit 75 of the low power system allows switching between conduction and interruption of an electric wire forming part of the circuit 75 of the low power system leading to the low voltage battery 40 to be performed by manual operation. Touching the fuse 62 housed between the rising portion 79a of the battery case 37 and the relay board 108 is allowed only when the circuit 75 of the low power system is interrupted by using the connector 71, by an action of touch prevention means 111.

The touch prevention means 111 is configured to allow the lid member 109 covering the fuse 62 housed between the rising portion 79a of the battery case 37 and the relay board 108 to be opened only when the circuit 75 of the low power system is interrupted by using the connector 71, and is provided by disposing the connector 71 to cover, from an opening side of the lid member 109, at least one of the multiple screw members 110 . . . fastening the lid member 109 to the rising portion 79a of the upper case 79. In other words, the connector 71 disposed to face the lid member 109 at a position on the opening side of the lid member 109 is disposed to allow the lid member 109 to be opened only when the connector 71 is manually interrupted.

Figure 10:
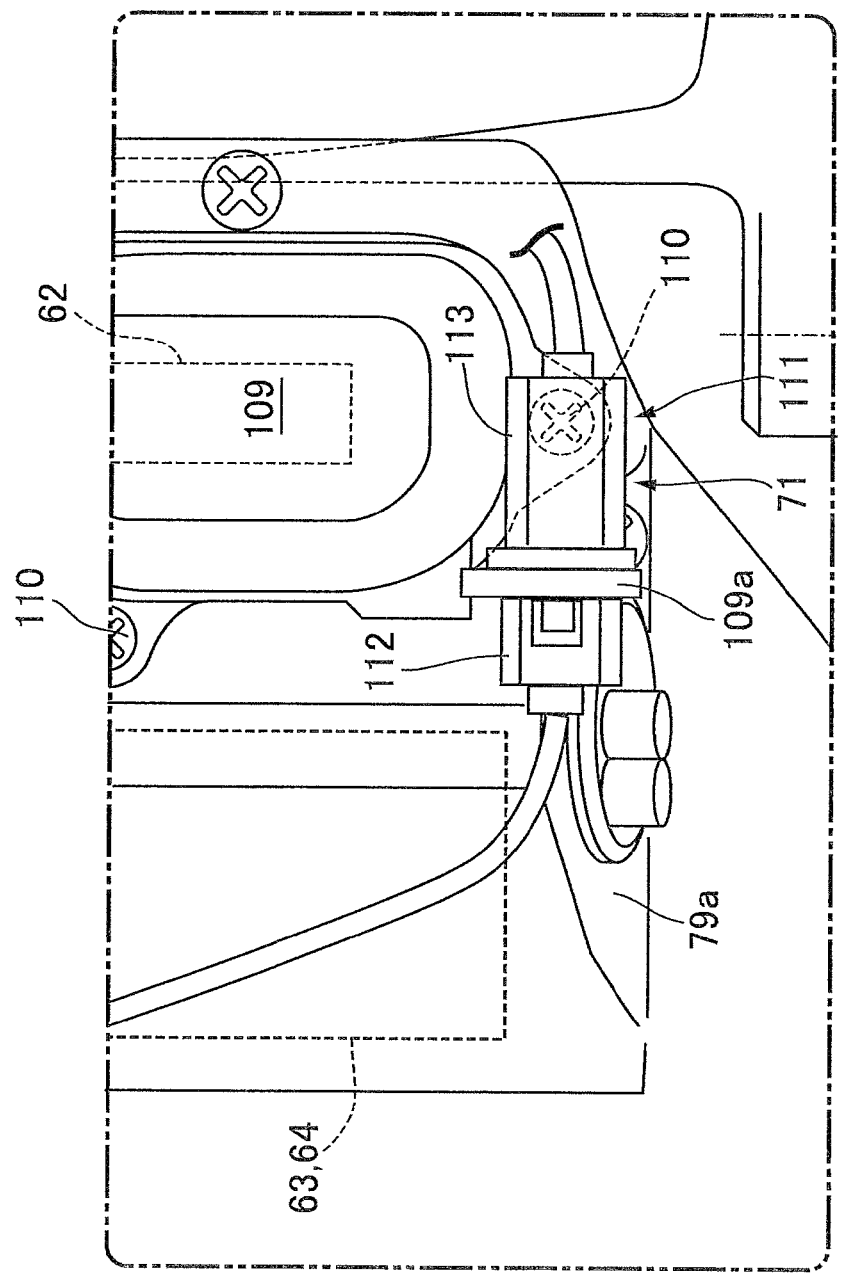
FIG. 10 is an enlarged view of a part indicated by an arrow 10 in FIG. 9. (first embodiment)
Figure 11:
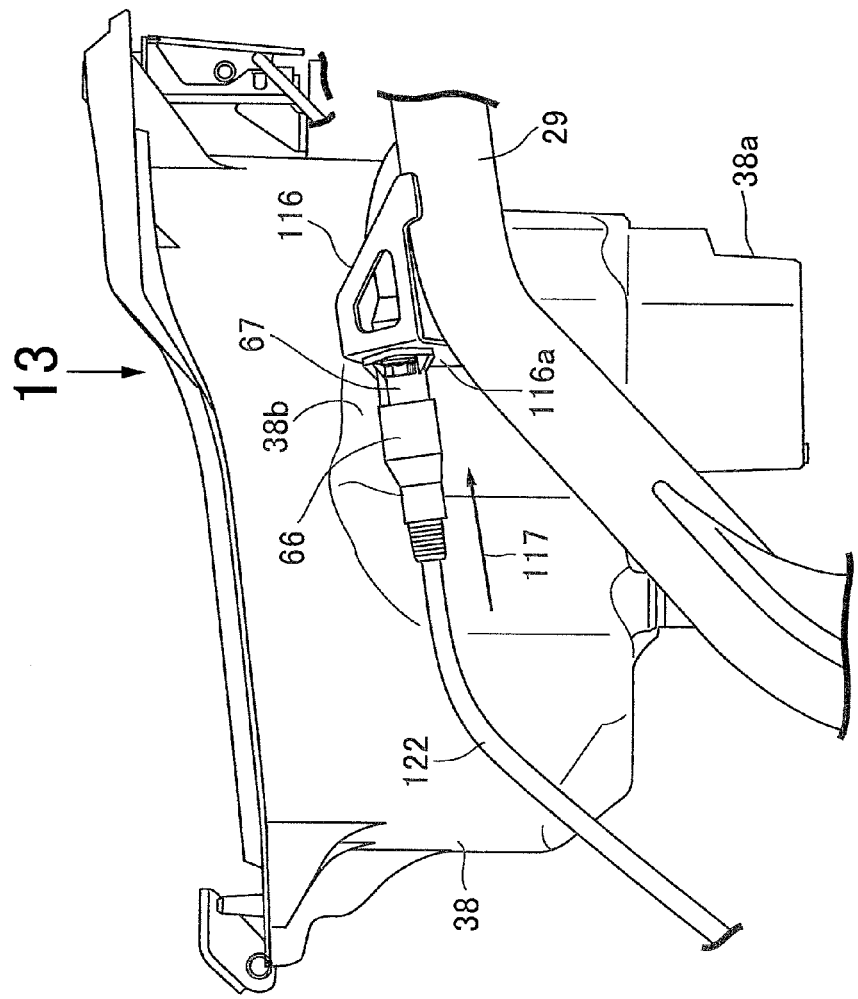
FIG. 11 is an enlarged view of an essential part in FIG. 2. (first embodiment)
Figure 12:
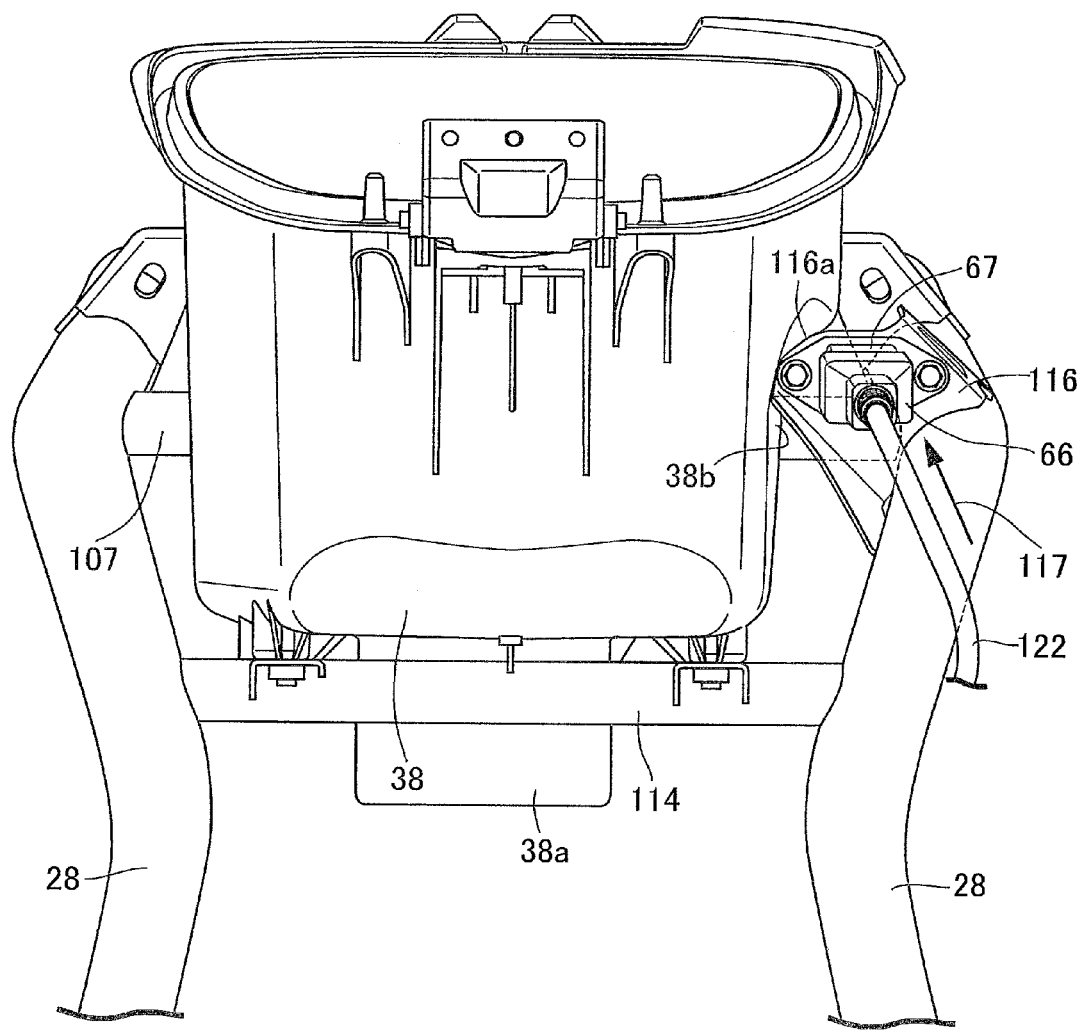
FIG. 12 is a view seen from an arrow 12 in FIG. 11. (first embodiment)
Figure 13:
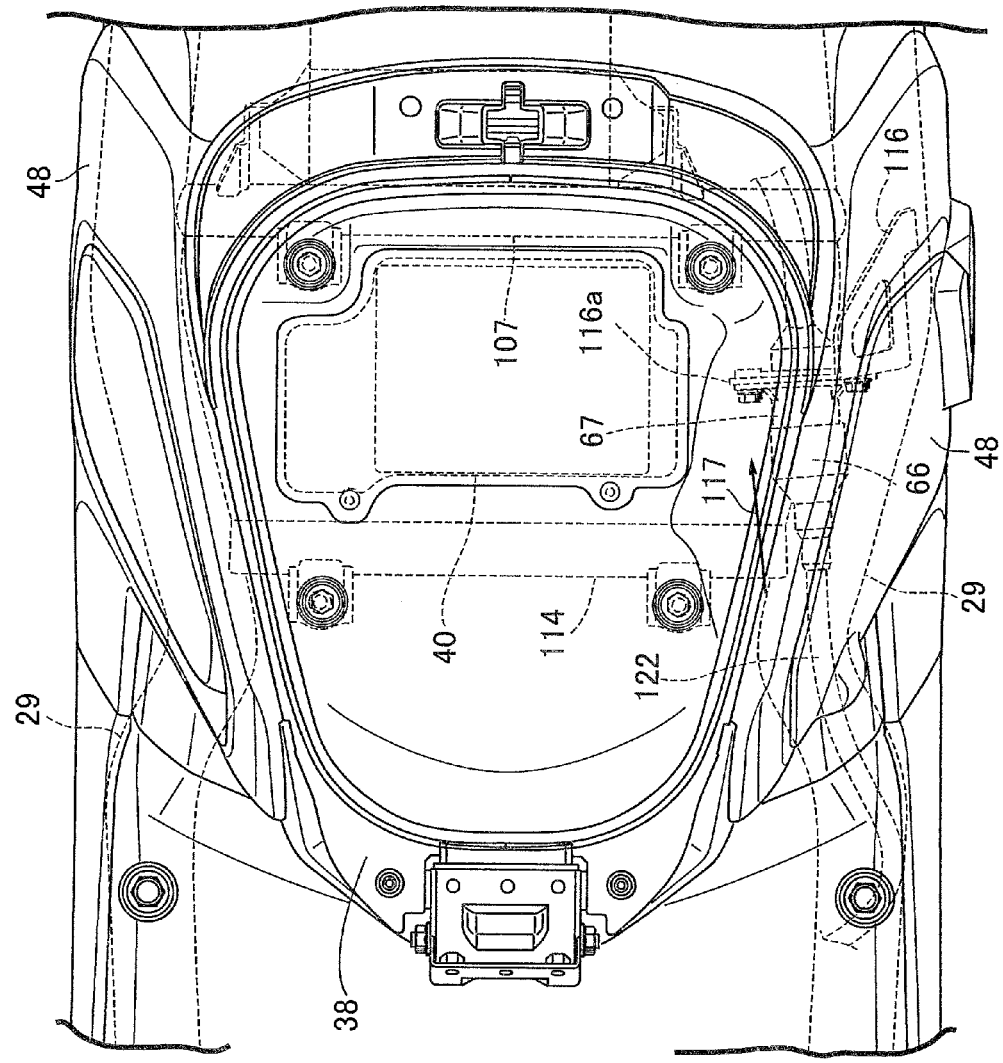
FIG. 13 is a view seen from an arrow 13 in FIG. 11. (first embodiment)
Figure 14:
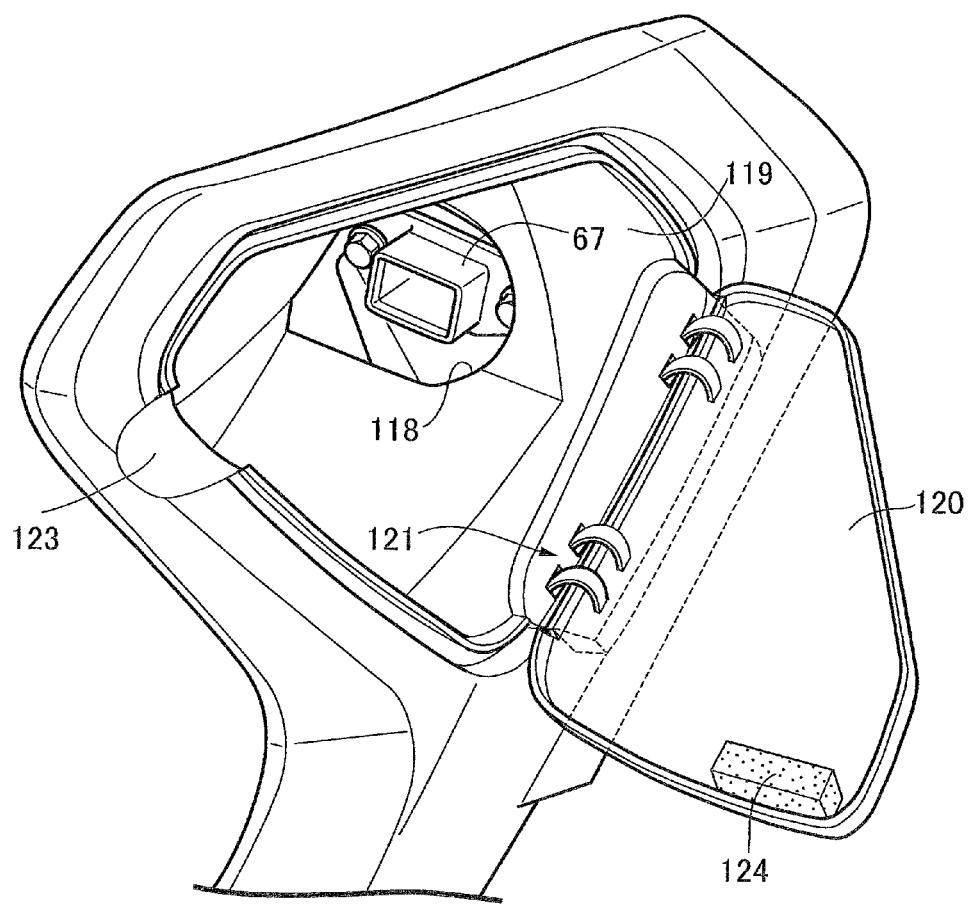
FIG. 14 is a side view showing a state in which an opening provided in a side cover is opened. (first embodiment)

Referring to FIG. 10, the connector 71 is formed of a pair of connector half bodies 112, 113 separatable from each other. The connector half body 112 of both of the connector half bodies 112, 113 is inserted through and held by a holding portion 109a provided in the lid member 109, and the connector half body 113 connected to the connector half body 112 is disposed above one of the multiple screw members 110 . . . fastening the lid member 109 to the rising portion 79a of the upper case 79.

Referring to FIGS. 11 to 14, the housing box 38 is supported by the cross member 107 provided between both of the rear frames 29 . . . and a cross member 114 provided between both of the rear frames 29 . . . at a position frontward of the cross member 107. The power-receiving-side connector 67 to which the power-supplying-side connector 66 leading to the charger 65 can be inserted and connected is disposed on a lateral side of the housing box 38, the lateral side on a side where the side stand 31 is disposed in the vehicle width direction. A stay 116 having an attachment portion 116a is fixed to the left rear frame 29 of the pair of right and left rear frames 29 . . . which forms part of the vehicle-body frame F and which is disposed on the lateral side of the housing box 38, the attachment portion 116a extending inward from the corresponding rear frame 29. The power-receiving-side connector 67 is attached to the attachment portion 116a.

An insertion-connection direction 117 of the power-supplying-side connector 66 to the power-receiving-side connector 67 is set to be inclined inwardly in the vehicle width direction toward the power-receiving-side connector 67 from the front or the rear of the power-receiving-side connector 67. In this embodiment, the insertion-connection direction 117 of the power-supplying-side connector 66 insertable and connectable to the power-receiving-side connector 67 from the front is set to be inclined inwardly in the vehicle width direction toward the power-receiving-side connector 67 from the front. The insertion-connection direction 117 is a direction of a force which is applied to a hinged support of the main stand 34 during the insertion and connection of the power-supplying-side connector 66 to the power-receiving-side connector 67 and which causes the main stand 34 to be maintained on a standing position side, the main stand 34 turning forward from a housed position to be set to a standing position. In other words, the insertion-connection direction 117 is a direction toward the rear.

The side cover 48 to the left of the housing box 38 is provided with an opening 118 through which the power-receiving-side connector 67 can be seen. The opening 118 is provided in a recess portion 119. The recess portion 119 is formed in the side cover 48 to be recessed inward from an outer surface of the side cover 48.

Moreover, the opening 118 and the recess portion 119 are covered with a lid member 120 openably and closably attached to the side cover 48. The lid member 120 is supported by the side cover 48 via a hinge mechanism 121 to be set to an open position by operating it rearward in the front-rear direction of the vehicle. A rotation axis CL (see FIG. 1) of the lid member 120 is set to be inclined upward toward the rear.

Furthermore, a lead-out groove 123 is provided in a front portion of the recess portion 119. The lead-out groove 123 is used to lead out a conducting wire 122 leading to the power-supplying-side connector 66 to the outside from a space between the side cover 48 and the lid member 120 when the lid member 120 is closed while the power-supplying-side connector 66 is connected to the power-receiving-side connector 67. An elastic member 124 to be interposed between the conducting wire 122 and the lid member 120 is attached to an inner surface of the lid member 120.

In addition, a housing recess portion 38b for housing and disposing therein at least part of the power-receiving-side connector 67 (part in this embodiment) is formed in an outer surface of a left wall of the housing box 38 by being recessed inward.

Next, an operation of the embodiment is described. The high voltage battery 36 supplying the electric power of high voltage to the electric motor 23 generating the power to drive the rear wheel WR is housed in the battery case 37, and the cooling air is introduced into the battery case 37 from the cooling air introduction ducts 88 . . . by activating the cooling fan 105. Here, the openings 90 . . . opened toward the rear of the vehicle is provided in the leg shield 43, and the upstream ends of the cooling air introduction ducts 88 . . . are connected to the leg shield 43 to lead respectively to the openings 90 . . . . Thus, relatively clean air is more likely to be led into the battery case 37, and dusts and the like are less likely to be accumulated in an air course. Hence, increase in an air course resistance in a long term use can be suppressed.

Moreover, the recess portion 91 is formed in the leg shield 43, the recess portion 91 recessed forward from the back surface of the leg shield 43 and provided with the openings 90 . . . in the upper portion thereof. The air introduction port 97 communicating with the openings 90 . . . is formed between the lower edge of the lid 94 and the lower portion of the recess portion 91, the lid 94 covering the openings 90 . . . and attached to the leg shield 43. Thus, rain water is less likely to enter the cooling air introduction ducts 88 . . . from the openings 90 . . . . This suppresses increase of the air course resistance due to the adhesion of dust to the inner surface of the cooling air introduction ducts 88 . . . which is caused by rain water.

Furthermore, the first protrusions 98, 99 extending long in the vehicle width direction and protruding rearward are provided in the recess portion 91 in such a way that a gap allowing air to flow is formed between the lid 94 and each of the first protrusions 98, 99, and the second protrusions 100, 101 extending long in the vehicle width direction and protruding forward are provided on the inner surface of the lid 94 in such a way that a gap allowing air to flow is formed between the recess portion 91 and each of the second protrusions 100, 101. Thus, rain water can be removed by the first and second protrusions 98, 99; 100, 101. Hence, entrance of rain water into the cooling air introduction ducts 88 . . . can be more effectively prevented. The first protrusions 98, 99 serve the function of reinforcement ribs, and thus the rigidity of the leg shield 43 can be improved. The second protrusions 100, 101 serve the function of reinforcement ribs, and thus the rigidity of the lid 94 can be improved. Moreover, the multiple, for example, two first protrusions 98, 99 and the multiple, for example, two second protrusions 100, 101 are arranged alternately in the up-down direction. Thus, entrance of rain water into the cooling air introduction ducts 88 . . . can be prevented more effectively.

In addition, the sponge-like filter member 104 is interposed between the leg shield 43 and the lid 94 to be provided between the air introduction port 97 and both of the openings 90 . . . . Thus, air led into the battery case 37 can be made cleaner. Hence, increase in the air course resistance in a long term use can be more effectively suppressed.

Moreover, the axle 102 of the front wheel WF is disposed forward of the leg shield 43, and at least part of the openings 90 . . . is disposed above the upper end of the front wheel WF in the side view. Thus, the distance from a road surface to each of the openings 90 . . . is made relatively large. Hence, dust thrown up from the road surface can be made less likely to enter the openings 90 . . . .

Incidentally, the battery case 37 is disposed between the pair of right and left under frames 28 . . . extending rearward from the lower portion of the down frame 27 extending downward toward the rear from the head pipe 26, and the cooling air introduction ducts 88 . . . are disposed in the leg shield 43 to extend along the down frame 27. Thus, the leg shield 43 can be made compact even in a configuration in which the cooling air introduction ducts 88 . . . are housed in the leg shield 43. Hence, increase in size of the leg shield 43 can be suppressed. Moreover, the pair of right and left cooling air introduction ducts 88 . . . are disposed in a way that the down frame 27 is interposed therebetween from both sides. This enables increase in size of the cooling air introduction ducts 88 to be avoided while securing a sufficient amount of cooling air to be introduced into the battery case 37.

The cooling fan 105 which has its intake side connected to the battery case 37 covered with the vehicle body cover 41 and which has the exhaust port 106 thereof opened toward one side of the battery case 37 in the width direction is attached to the rear portion of the upper surface of the battery case 37 at the position offset from the width direction center C of the battery case 37 to the other side. Thus, an air course resistance caused when air exhausted from the cooling fan 105 hits the vehicle body cover 41 and is thereby deflected can be reduced.

Moreover, the fuse 62 and the first and second relay switches 63, 64 are provided in the circuit 74 of the high power system leading to the high voltage battery 36, the first and second relay switches 63, 64 capable of performing switching between connection and disconnection of the circuit 74 of the high power system by being supplied with the electric power from the circuit 75 of the low power system leading to the low voltage battery 40, and also interrupting the circuit 74 of the high power system when the circuit 75 of the low power system is interrupted. The connector 71 allowing switching between the connection and disconnection of the circuit 75 of the low power system to be performed by the manual operation is provided in the circuit 75 of the low power system. Touching of the fuse 62 for maintenance is allowed only when the circuit 75 of the low power system is interrupted by using the connector 71, by the action of the touch prevention means 111 configured to allow the lid member 109 covering the fuse 62 housed between the rising portion 79a of the battery case 37 and the relay board 108 to be opened only when the circuit 75 of the low power system is interrupted by using the connector 71.

Accordingly, the following can be said. Touching of the fuse 62 is allowed only when the circuit 75 of the low power system is interrupted, and in this state, the circuit 74 of the high power system is interrupted since the first and second relay switches 63, 64 are in an interrupted state. Thus, the interruption of the circuit 75 of the low power system by using the connector 71 is required when the maintenance of the fuse 62 is to be performed. This makes it easier to follow a work procedure in the maintenance of the fuse 62 of the high power system.

In addition, the lid member 109 is fastened to the rising portion 79a of the upper case 79 of the battery case 37 housing the high voltage battery 36, by using the multiple screw members 110 . . . . The connector 71 is disposed to face the lid member 109 at the position on the opening side of the lid member 109 in such a way that the opening of the lid member 109 is allowed when the connector 71 is manually interrupted. The touch prevention means 111 is provided by disposing the connector 71 in the following way: the connector 71 covers at least one of the multiple screw members 110 . . . from an opening side of the lid member 109 while allowing the switching between the conduction and interruption of the conductive wire forming part of the circuit 75 of the low power system to be performed by a manual operation. Thus, the touch prevention means 111 of a simple structure can be configured by allowing the lid member 109 to be opened when the connector 71 is interrupted manually.

Moreover, the fuse 62 and the lid member 109 are each disposed at a position offset from the width direction center of the battery case 37 to one side in the plan view. Thus, maintenance work from the one side of the vehicle body B in the width direction can be made easier.

Furthermore, the high voltage battery 36 is disposed between the pair of right and left under frames 28 . . . , and the low voltage battery 40 is disposed between the pair of right and left rear frames 29 . . . . Thus, the high voltage battery 36 and the low voltage battery 40 can be protected from the outside. The first and second relay switches 63, 64 are disposed between the high voltage battery 36 and the low voltage battery 40 in the side view. Thus, relay wiring can be made compact.

Moreover, the front portion of the swingarm 22 is swingably supported by the pivot plates 30 . . . provided in the front portions of both of the rear frames 29 . . . of the vehicle-body frame F. The electric motor 23 and the power drive unit 61 disposed frontward of the rear wheel WR to drive the electric motor 23 are provided in the swingarm 22. The first and second relay switches 63, 64 are disposed in the region surrounded by the high voltage battery 36, the low voltage battery 40, and the power drive unit 61 in the side view. Thus, it is possible to dispose the electrical parts of a high voltage system around the first and second relay switches 63, 64, and make wiring of the high voltage system compact.

Incidentally, the housing box 38 is disposed below the rider seat 39 on which the rider seats. The opening 118 covered with the openable and closable lid member 120 is provide in the side cover 48 covering the housing box 38 below the rider seat 39. The power-receiving-side connector 67 to which the power-supplying-side connector 66 leading to the charger 65 can be inserted and connected is fixed and disposed between the side cover 48 and the housing box 38 to face the opening 118. Thus, opening and closing works of the rider seat 39 covering the housing box 38 from above is unnecessary, and a charging work can be performed with the rider seat 39 closed. Hence, the charging work is made easy, and convenience is improved.

Moreover, the insertion-connection direction 117 of the power-supplying-side connector 66 to the power-receiving-side connector 67 is set to be inclined inwardly in the vehicle width direction toward the power-receiving-side connector 67 from the front or the rear of the power-receiving-side connector 67. Thus, even when the power-receiving-side connector 67 is disposed between the side cover 48 and the housing box 38, the housing box 38 is secured to have a sufficient capacity. Furthermore, the main stand 34 which turns forward from the housing position to be set to the standing position is turnably supported by the swingarm 22, and the insertion-connection direction 117 of the power-supplying-side connector 66 insertable and connectable to the power-receiving-side connector 67 from the front is set to be inclined inwardly in the vehicle width direction toward the power-receiving-side connector 67 from the front. Thus, the force applied to the hinged support of the main stand 34 during the insertion and the connection of the power-supplying-side connector 66 to the power-receiving-side connector 67 is applied in such a direction that the main stand 34 is maintained at the standing position. Hence, the main stand 34 does not turn undesirably to a housing position side by the insertion and connection of the power-supplying-side connector 66 to the power-receiving-side connector 67.

Furthermore, the lid member 120 is supported by the side cover 48 to be set to an open position by operating it rearward in the front-rear direction of the vehicle, and the rotation axis CL of the lid member 120 is set to be inclined upward toward the rear. Thus, the lid member 120 is set to the open position by being operated rearward about the rotation axis CL inclined upward toward the rear, and the lid member 120 has a posture inclined downward toward the rear in an open state. Hence, during the charging with the lid member 120 opened, it is possible to avoid as much as possible undesirable turning of the lid member 120 to a closing side which is caused by an effect of wind and the like.

In addition, the recess portion 119 recessed inward from the outer surface of the side cover 48 is formed in the side cover 48 in such a way that the recess portion 119 can be closed with the lid member 120, and the opening 118 is provided in the recess portion 119. Thus, a portion where the recess portion 119 is formed functions as a reinforcement rib, and the strength of the side cover 48 can be thereby improved. Furthermore, a portion inward of the side cover 48 is covered with the recess portion 119 except for the opening 118. Thus, the power-receiving-side connector 67 can be easily found, and also it is less likely to drop small objects into the portion inward of the side cover 48 when the recess portion 119 is opened.

Moreover, the housing recess portion 38b for housing and disposing therein at least a part of the power-receiving-side connector 67 is formed in an outer surface of the left wall of the housing box 38 by recessing the outer surface inward. Thus, only a required portion of the side wall of the housing box 38 is recessed, and the reduction of capacity of the housing box 38 which is caused by disposing the power-receiving-side connector 67 between the side cover 48 and the housing box 38 is suppressed to a small degree.

Furthermore, the stay 116 having the attachment portion 116a is fixed to the rear frame 29 forming part of the vehicle-body frame F and disposed to the lateral side of the housing box 38, the attachment portion 116a extending inward from the rear frame 29. The power-receiving-side connector 67 is attached to the attachment portion 116a. Thus, the side cover 48 can be easily attached to the rear frames 29 . . . without the power-receiving-side connector 67 protruding outward from the rear frame 29.

In addition, the power-receiving-side connector 67 and the opening 118 are disposed on the lateral side of the housing box 38, the lateral side on the side where the side stand 31 is disposed, the side stand 31 maintaining the standing state in which the vehicle body B is inclined to one side in the vehicle width direction. This improves workability of charging in a parked state with the side stand 31 standing.

Moreover, the power-receiving-side connector 67 to which the power-supplying-side connector 66 leading to the external power source PS via the charger 65 can be connected is connected to the high voltage battery 36 and the low voltage battery 40 via the DC-DC converter 68 disposed rearward of the housing box 38. Thus, reverse flows from the batteries 36, 40 to the power-receiving-side connector 67 are less likely to occur.

An embodiment of the present invention has been described above. However, the present invention is not limited to the embodiment described above, and various design changes can be made without departing from the gist of the present invention.

For example, the case of applying the present invention to the electric two-wheeled motor vehicle is described in the embodiment. However, the invention is applicable to an electric three-wheeled motor vehicle. The present invention can be widely carried out in association with an electric vehicle whose power for driving a drive wheel is generated by an electric motor.

The invention claimed is:

1. An electric vehicle in which a high voltage battery supplying electric power to an electric motor generating power to drive a drive wheel and a low voltage battery supplying electric power to an accessory are mounted in a vehicle body, wherein
the electric vehicle comprises:
a breaker which is provided in a circuit of a high power system linked to the high voltage battery;
a manual connection-disconnection device for allowing switching between connection and disconnection of a circuit of a low power system linked to the low voltage battery to be performed by a manual operation, the manual connection-disconnection device provided in the circuit of the low power system;
a relay switch which is capable of performing switching between connection and disconnection of the circuit of the high power system by being supplied with electric power from the circuit of the low power system, and which interrupts the circuit of the high power system when the circuit of the low power system is interrupted; and
a touch prevention device for allowing the breaker to be touched only when the circuit of the low power system is interrupted by using the manual connection-disconnection device.

2. The electric vehicle according to claim 1, wherein the touch prevention device is configured to allow a lid member covering the breaker and openably and closably attached to a case to be opened only when the circuit of the low power system is interrupted by using the manual connection-disconnection device.

3. The electric vehicle according to claim 2, wherein the manual connection-disconnection device is disposed at a position facing the lid member from an opening side of the lid member, in a way that the lid member is allowed to be opened when the manual connection-disconnection device is manually interrupted.

4. The electric vehicle according to claim 2 or 3, wherein
the lid member is fastened to the case forming part of a battery case housing the high voltage battery, by using a plurality of screw members, and
the touch prevention device is provided by disposing a connector being the manual connection-disconnection device in a way that the connector covers, from the opening side of the lid member, at least one of the plurality of screw members while allowing switching between conduction and interruption of a conductive wire forming part of the circuit of the low power system to be performed by a manual operation.

5. The electric vehicle according to claim 4, wherein the breaker and the lid member are each disposed at a position offset from a center in a width direction of the battery case to one side in a plan view.

6. The electric vehicle according to claim 1, wherein
a vehicle-body frame forming part of the vehicle body includes: a down frame extending downward toward the rear from a head pipe steerably supporting a front fork pivotally supporting a front wheel; a pair of right and left under frames extending rearward from a lower portion of the down frame; and a pair of right and left rear frames extending upward toward the rear respectively from rear portions of the under frames,
the high voltage battery is disposed between the pair of right and left under frames,
the low voltage battery is disposed between the pair of right and left rear frames, and
the relay switch is disposed between the high voltage battery and the low voltage battery in a side view.

7. The electric vehicle according to claim 6, wherein
a front portion of a swingarm pivotally supporting a rear wheel being the drive wheel is swingably supported by the rear frames of the vehicle-body frame,
the electric motor and a power drive unit disposed frontward of the rear wheel for controlling the electric motor are provided in the swingarm, and
the relay switch is disposed in a region surrounded by the high voltage battery, the low voltage battery, and the power drive unit in the side view.

* * * * *